D. A. WOODWARD.
FLUID LENS.

No. 60,109. Patented Nov. 27, 1866.

Witnesses,
W. Morris Smith.
Sydney E. Smith.

Inventor,
D. A. Woodward

United States Patent Office.

IMPROVEMENT IN FLUID LENSES.

D. A. WOODWARD, OF BALTIMORE, MARYLAND.

Letters Patent No. 60,109, dated November 27, 1866.

SPECIFICATION.

TO ALL WHOM IT MAY CONCERN:

Be it known that I, DAVID A. WOODWARD, of the city of Baltimore, in the State of Maryland, have invented a new and improved mode of constructing Fluid Lenses; and I do hereby declare that the following is a full, clear, and exact description thereof, reference being had to the accompanying drawings, through letters of reference marked thereon, in which—

Figure 1:
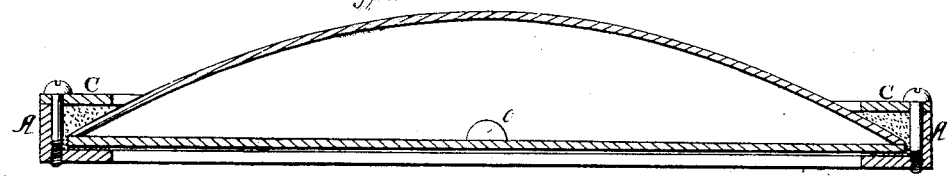
Figure 1 represents a lens of the plano-convex form, constructed according to my invention.
Figure 2:
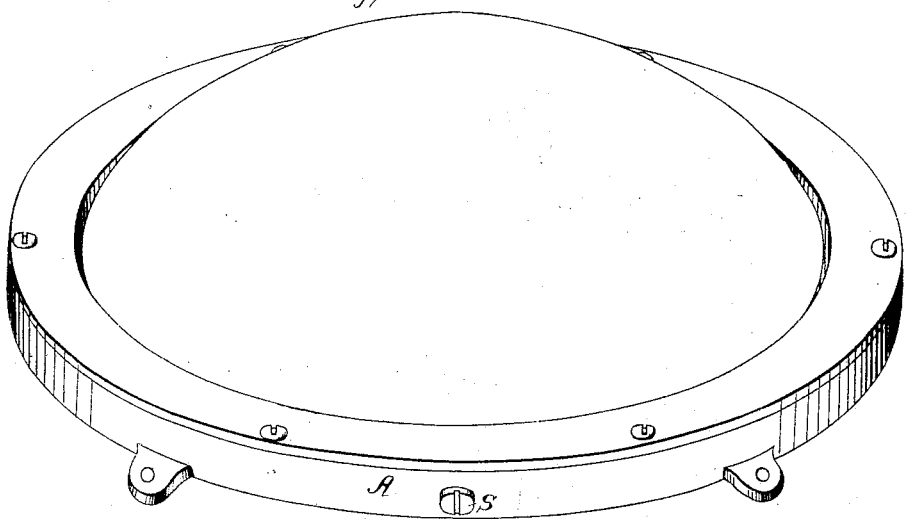
Figure 2 is a perspective view of the same.
Figure 3:
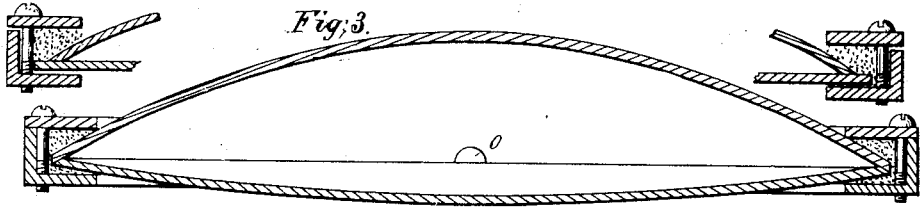
Figure 3 is a double convex lens.
Figure 4:
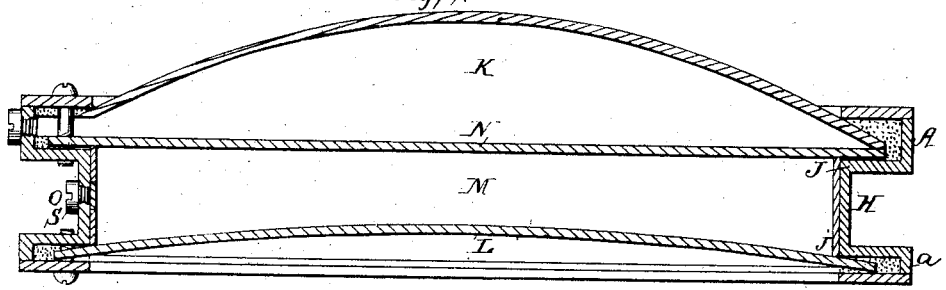
Figure 4 represents the manner of combining two cells for making an achromatic lens.

Figures 1, 3, and 4, being transverse sectional views taken through the centre of the lens.

Similar letters of reference indicate corresponding parts in the several figures.

The nature of my invention consists in bending circular disks of polished flattened or plate glass to any required curvature, either spherical or parabolical, and afterwards cementing and firmly securing them together by means of rings or bands of metal, or other suitable material, thus forming cells for holding fluids, whereby a fluid lens, or any combination of fluid lenses, may be made of any required focus, and of a size much larger than can be made of solid glass; and by means of the spherical or parabolically curved glasses, the metallic rabbeted rings, and system of cementing which I employ, a combination of cells may be made for holding fluids of different index of refraction, thus forming a fluid lens which will overcome both spherical and chromatic aberration in its own construction.

To enable others to make and use my invention, I will proceed to describe its construction and operation, with reference to the drawings.

A hollow or dish-like mould of soap-stone or other suitable material is prepared of the precise mathematical curve or concave required; the glass is cut in a circular form of the required size and placed on the mould, when it is exposed to a heat just sufficient to cause the glass to bend by its own weight and conform itself to the bottom of said concave mould. If this operation is properly conducted, and not too much heat employed, the polished surface of the glass shell thus formed will not be in the least injured. To combine two or more of these glasses or shells, I use a metallic ring, A, forming on its inner side a rabbet of annular shape, in which one of the glasses is imbedded in a suitable cement, and the shell or glass that is to form the other side of the cell is then laid on and the cement well packed in the rabbet and around the edges of the glasses; the flat ring, C, is then screwed or bolted down upon the cement, holding it firmly and compactly in the rabbet. An opening or aperture, O, is formed through the metallic ring, cement, and edges of the curved glass or glasses, for the introduction of the fluid, and is provided with a screw-plug or stopper, S, to retain it. The fluid or liquid used may be a saturated solution of alum, choride of sodium or calcium, or concentrated glycerine; and doubtless there are many others equally suitable; I do not, therefore, restrict myself to any in particular. In charging the cells of the achromatic lens, the plano-concave is first filled with the saturated solution, and then the other with the same solution diluted; the amount or degree of dilution required will vary with the various curvatures of the plates, and is best determined by allowing the light to pass through and diluting until the chromatic aberration is corrected, which is known by the disappearing of the colored fringe around the reflection on the wall or other object. Any of the above-mentioned fluids dilute with water or alcohol. The cement used must be adapted to resist the action of the particular fluid to be used. For any of the above, red lead, white lead, putty, or any oleaginous paste answers well; gutta percha or India rubber may be used; but for bisulphuret of carbon or the like, which mix freely with oil, an earthy base, such as kaolin mixed with gum tragacanth, will answer well for the cement. I do not, therefore, restrict myself to any in particular.

In making an achromatic lens, I use two rabbeted rings, A a, connected by a cylinder, H, as represented in fig. 4. In the rabbet of the ring A is cemented a circular flat plate glass and a curved glass or shell, which form a plano-convex cell, K; or two curved glasses may be used, forming a double convex cell; and in the rabbet of the ring a is secured another curved glass, L, with its concave side outwards, thus forming with the flat plate glass N another cell of the plano-concave form, M, to be filled through an opening, O', in the cylinder, H, with a fluid of a high refracting index, (the bisulphuret of carbon, for instance,) whilst the cell K is filled with a fluid of a lower refracting index, as hereinbefore described. The refracting power of the two fluids in their respective cells, being properly adjusted in relation to each other by dilution or otherwise, are made to correct each other for chromatic aberration in the same manner that a solid biconvex lens of crown glass and a solid biconcave lens of flint glass correct each other in the ordinary way.

Doubtless curved glasses could be made by some other method than that herein described, either by blowing, pressing, or grinding and polishing, but the process herein described for bending is practically by far the cheapest and best.

I am aware that fluid lenses have been made by cementing together two watch crystals for experimental purposes; also that attempts have been made to use refracting fluids in combination with a lens of crown or solid glass in order to correct chromatic aberration. I am also aware that bending glass by its own weight when highly heated is not new. I therefore do not claim either of these *per se;* but,

What I claim as my invention, and desire to secure by Letters Patent, is—

1. The method herein described of bending disks of glass so as to produce a convex or concave lens of spheroidal, parabolic, or hyperbolic profile, for the purpose set forth.

2. The use of two or more pieces of plate or flattened glass, bent to the required curve or profile, as herein specified, in combination with the cement and rings, or their equivalents, for holding them together, substantially as set forth.

3. Combining, with three or more glasses formed into cells as described, fluids of different index of refraction, that will correct chromatic aberration, substantially as described.

D. A. WOODWARD.

Witnesses:
   HANSON E. WEAVER,
   W. MORRIS SMITH.